United States Patent

Wells

[15] 3,680,417
[45] Aug. 1, 1972

[54] SENSOR FOR DETERMINING BAND SAW BLADE DEFLECTION

[72] Inventor: Jan R. Wells, Park Township, St. Joseph County, Mich.

[73] Assignee: W. F. Wells and Sons, Inc., Three Rovers, Mich.

[22] Filed: April 27, 1970

[21] Appl. No.: 32,283

[52] U.S. Cl. ............... 83/74, 83/201.04, 83/201.14, 143/17 A, 307/308
[51] Int. Cl. ............................................. B23d 53/00
[58] Field of Search..83/74, 72, 201, 201.04, 201.06, 83/201.14; 143/17 A; 307/308; 340/177 VZ; 317/235 M

[56] References Cited

UNITED STATES PATENTS

| 3,403,307 | 9/1968 | Rindner | 307/308 X |
|---|---|---|---|
| 3,566,216 | 2/1971 | Doering | 307/308 X |
| 2,815,561 | 12/1957 | Crane | 83/74 |
| 2,754,567 | 7/1956 | Crane | 83/72 |
| 3,470,392 | 9/1969 | Habermehl et al. | 307/308 |
| 2,602,987 | 7/1952 | Wells | 143/17 A X |
| 3,072,158 | 1/1963 | Durate | 143/17 A X |
| R26,377 | 4/1968 | Whitmore | 83/201.06 |

Primary Examiner—James M. Meister
Attorney—Gordon W. Heuschen and Talivaldis Cepuritis

[57] ABSTRACT

Blade deflection sensor comprises a deflectable cantilevered arm of a rigid member, mechanically coupled to a band saw blade and adapted to bear against the base-emitter junction of a piezotransistor mounted on the rigid member in response to a deflection of the blade.

3 Claims, 4 Drawing Figures

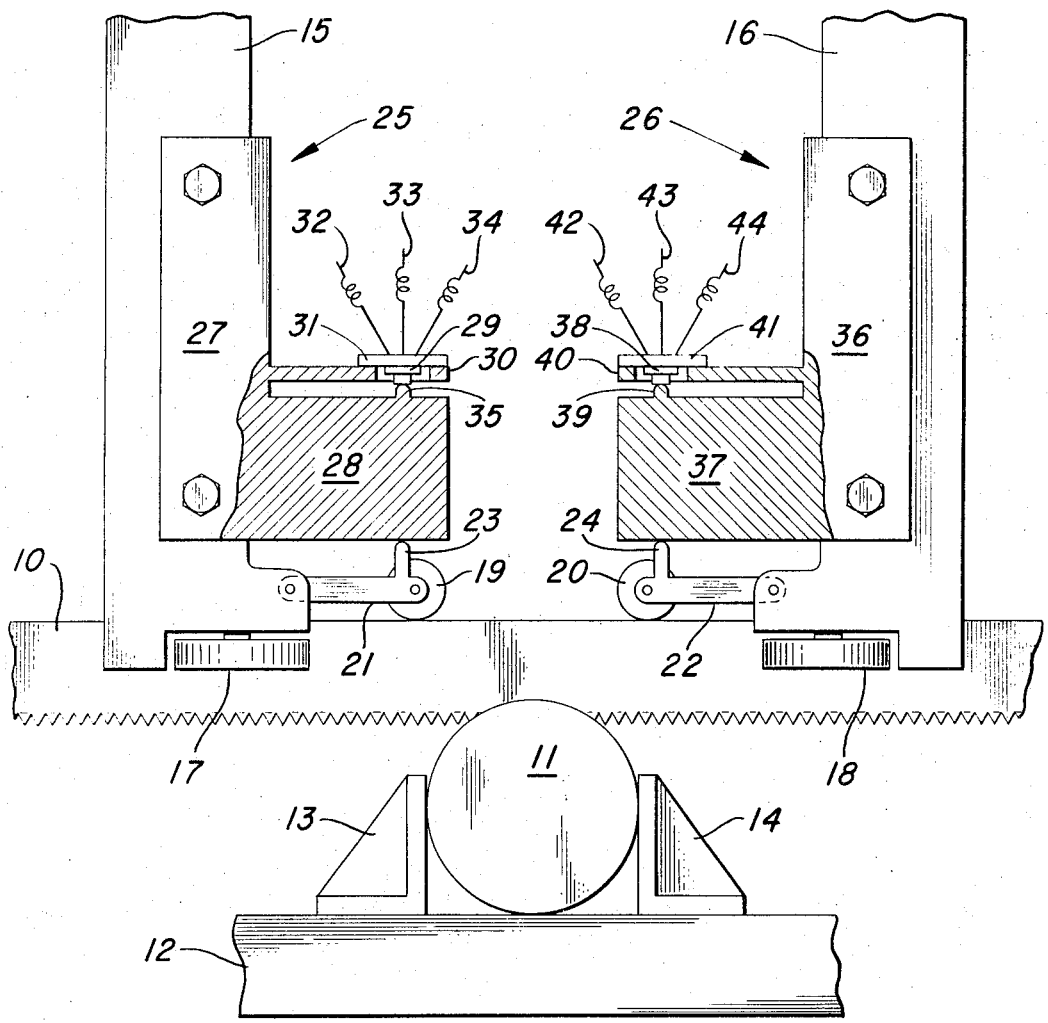
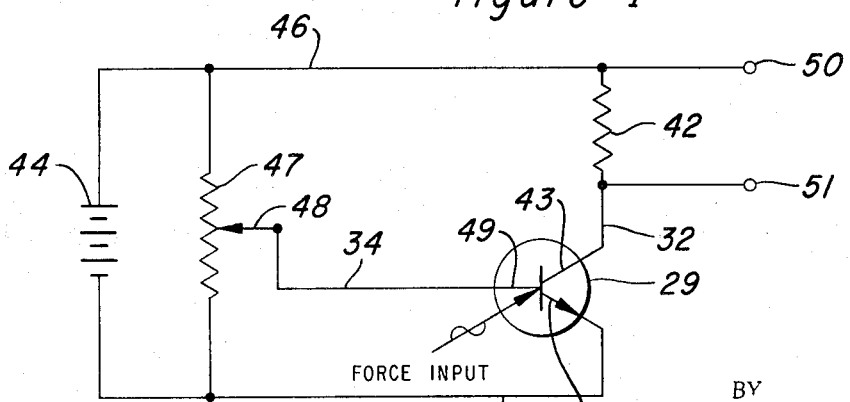
figure 1
figure 2

INVENTOR.
JAN R. WELLS

SENSOR FOR DETERMINING BAND SAW BLADE DEFLECTION

BACKGROUND OF THE INVENTION

In a band saw the rate of advance of a saw blade through the workpiece is controlled by the back pressure experienced by the blade as a result of bearing against the workpiece. The extent of back pressure encountered during sawing causes the blade to flex and deflect. It is known to sense this deflection hydraulically by a saw blade back-up roller or back-up bearing which is vertically displaceable as the saw blade deflects upwardly and which regulates a hydraulic valve which, in turn, controls the rate of advance of the saw blade. A typical presently known hydraulic sensor means regulating a hydraulic valve is shown in U.S. Pat. Nos. 2,601,576 and 2,602,987.

However, a substantial deflection of the saw blade, usually of the order of about one-sixteenth of an inch is necessary to activate the hydraulic valve. The practical effect of this is that a minimum cutting force of at least about 25 pounds is required for controllable saw blade advance. Additionally, the minimum cutting force attainable varies depending on the location of the hydraulic sensor relative to the position of the workpiece on the band saw, that is, the farther away the hydraulic sensor is located from the point of the cut, the greater will be the required minimum cutting force for adequate control. With the usual arrangement of two hydraulic sensors situated at opposite ends of the work zone, the minimum cutting force at the center of the work zone is about twice that at the sides of the work zone.

A further difficulty encountered with hydraulic sensors is that hydraulic cylinders do not bleed well at small displacements due to friction and expansion of hydraulic hoses and the fluid itself. Thus the saw blade is subjected to shock loading due to uneven rates of advance which, in turn, adversely affects blade life.

It is an object of the present invention to minimize the aforesaid shortcomings and to provide an electronic sensor sensitive to blade deflections of 0.1 microinch or less which permits the attainment of substantially lower controllable minimum cutting forces and to provide sensor systems the signal output of which is not dependent on the location of the sensors relative to the workpiece but which is substantially constant for any workpiece position on the band saw. Still other objects will readily present themselves to the skilled artisan upon reference to the ensuing specification, the drawings, and the claims.

SUMMARY OF THE INVENTION

The present invention contemplates a sensor which comprises a rigid member adapted to be mounted on a saw blade guide means. The rigid member is provided with an elastically deflectable cantilevered arm mechanically coupled to a saw blade and responsive to a deflection thereof. Upon deflection, the cantilevered arm is adapted to bear against a base-emitter piezojunction of a piezojunction transistor provided with collector, emitter, and base electrodes and mounted on the rigid member. The collector electrode of said transistor is connected in series with a load resistor, and a suitable direct current source is connected across the load resistor and the emitter electrode of said transistor. A suitable bias current source is connected across the emitter and the base electrodes of the transistor. The sensor output voltage is measured across the load resistor.

BRIEF DESCRIPTION OF THE DRAWINGS

In the drawings,

FIG. 1 is an elevational view, partly in section, showing the electronic sensor means of this invention and the relationship thereof to a saw blade and workpiece;

FIG. 2 is a schematic of the circuitry for the sensor of this invention;

DESCRIPTION OF THE PREFERRED EMBODIMENTS

Figure 3:
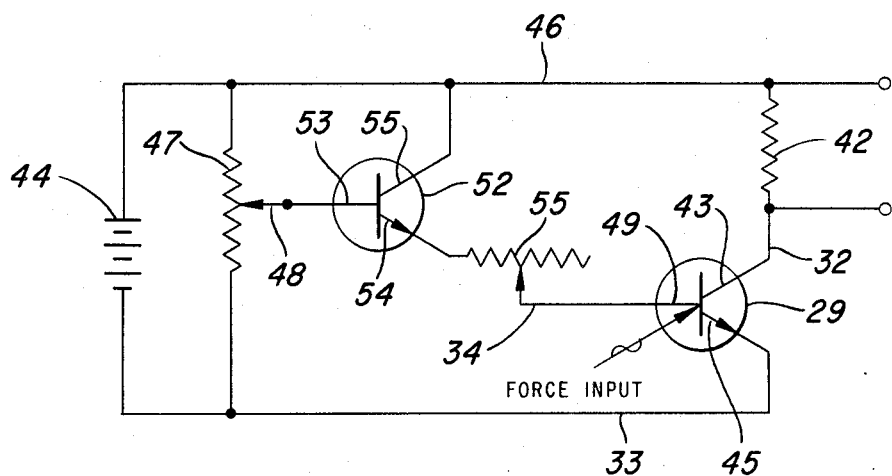
FIG. 3 is another schematic of circuitry provided with a temperature stabilization means.

Referring to FIG. 1, a band saw blade 10 is situated over workpiece 11 held in place on work platform 12 by vise jaws 13 and 14. Blade guide means 15 and 16 are mounted on a conventional blade carrier, not shown, and engage blade 10 on opposite sides between pairs of rollers 17 and 18. Back-up rollers 19 and 20 engage the upper edge of blade 10 and are pivotally mounted by means of arms 21 and 22, respectively, on the corresponding guides 15 and 16. Arms 21 and 22 are also provided with upwardly extending elongated members 23 and 24, respectively.

Electronic sensors 25 and 26 are rigidly mounted on respective guides 15 and 16. In some applications one sensor is sufficient, whereas in others a pair of sensors is utilized.

Sensor 25 comprises rigid member 27 having a cantilevered arm 28 which is mechanically coupled to blade 10 by abutting elongated rod 23 of arm 21 and by roller 19. Any upward deflection of blade 10 is transmitted in this manner to arm 28. The cantilevered arm is elastically deflectable by the action of blade 10 in conjunction with roller 19 and member 23 and is adapted to bear at projection 35 against the base-emitter piezojunction of transistor 29 which is mounted on rigid member 27, preferably mounted on a spaced, non-deflecting stationary arm 30 of said rigid member 27 by means of a suitable back-up plate 31. Leads 32, 33, and 34 pass through plate 31 and are connected to the collector, emitter, and base electrodes, respectively, of transistor 29.

Similarly, sensor 26 comprises rigid member 36 having a cantilevered arm 37 mechanically coupled to blade 10 by abutting elongated rod 24 of arm 22 and by roller 20. Again, any upward deflection of blade 10 is transmitted to cantilevered arm 37 which bears against the base-emitter piezojunction of transistor 38 at projection 39. Transistor 38 is mounted by means of plate 41 on a stationary, non-deflecting arm 40 of rigid member 36 spaced from cantilevered arm 37. Leads 42, 43, and 44 pass through plate 41 and are connected to the collector, emitter, and base electrodes, respectively, of transistor 38. Supportive circuitry for sensors 25 and 26 can be mounted on the rigid members 27 and 36 thereof or in any other convenient location.

Circuitry for sensor 25 is illustrated in FIG. 2. Load resistor 42 is connected in series with collector electrode 43 of piezojunction transistor 29 and a direct current source 44 is connected across load resistor 42 and emitter electrode 45 of piezojunction transistor 29 by leads 46 and 33, respectively. Suitable emitter bias current source is obtained by connecting a variable bias resistor 47 provided with a center tap 48 across source 44 and by connecting base electrode 49 to center tap 48 by lead 34. In operation, the desirable bias current is set by adjusting variable bias resistor 47 in conventional manner and the signal output of the sensor is obtained across load resistor 42 at terminals 50 and 51. As the force input at the base-emitter junction varies due to the deflection of the saw blade the current flow through load resistor 42 changes and manifests itself as a changing voltage output across terminals 50 and 51.

Due to the temperature sensitivity of semiconductors, it is preferable to provide temperature stabilization means within the sensing circuit. One such suitable means is shown in FIG. 3 wherein a PNP transistor 52 is connected in the circuit by connecting the base electrode 53 thereof to center tap 48 of variable bias resistor 47, the emitter electrode 54 to base electrode 49 of piezojunction transistor 29 through variable resistor 56 and lead 34, and the collector electrode 55 to collector electrode 43 of transistor 29 through load resistor 42 and leads 46 and 32. In this manner any conductivity variations due to ambient temperature are equalized or offset within the circuit and without affecting the sensor output voltage.

Figure 4:
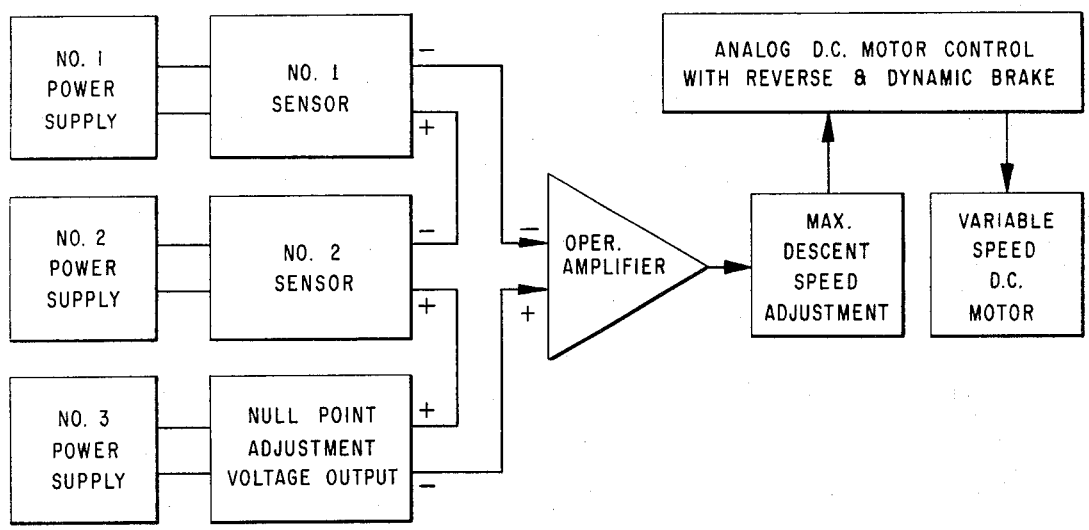
FIG. 4 is a block diagram showing the circuit elements for a system controlling saw blade rate of advance.

Referring to FIG. 4, in a representative electronic sensor and blade advance rate control system, the summed output voltages of two sensors, usually situated as shown in FIG. 1 on opposite sides of the workpiece, are series connected to a suitable null point adjustment, i.e., a variable voltage output of opposing polarity so as to form a conventional analog computer totalizing circuit the output of which is fed into an operational amplifier. The operational amplifier output then activates suitable motor controls and regulates the saw blade advance rate, subject to an overriding maximum advance rate adjustment.

For example, sensors No. 1 and No. 2, operating from their respective power supplies are set to provide a voltage output of 5 volts each in normal, non-cutting state, i.e., no blade deflection, by adjusting bias currents to the respective piezojunction transistors in the sensors. Additionally, the null point adjustment voltage output is adjusted to 10 volts so as to balance the summed voltage output of both sensors. At this state no unbalance signal is received by the operational amplifier and the saw blade will not be advanced.

Resetting null point to lower voltage provides an input to the amplifier, which, in turn, activates blade advance motor controls and energizes the motor. As the saw blade advances and contacts the workpiece, it is deflected upwardly and the voltage output of one or both of the sensors is reduced depending on the location thereof relative to the workpiece. If the workpiece is positioned in the center of the blade span defined by blade guides such as 15 and 16 of FIG. 1, the voltage output of each sensor decreases in the same amount. If, on the other hand, the workpiece is positioned off-center, reduction in sensor voltage output is not the same. In both instances, however, the sum of the two individual voltage outputs will be the same.

With the aforesaid setting the saw blade will be advanced until such time when the summed voltage output is balanced by the null point voltage, thus maintaining a virtually constant force on the saw blade during cutting. Moreover, if the saw blade feed overruns the null point setting, a voltage signal of opposite polarity is received by the operational amplifier which, in response thereto can energize a dynamic brake and stop the motor.

By suitably selecting the sensor voltage output as set forth hereinabove, and by choosing an appropriate null point voltage output value, any desirable maximum cutting force for the saw blade can be provided and maintained.

An adjustment for maximum blade advance speed is desirable to avoid blade overload when the blade makes an initial contact with the workpiece to be cut and also when the workpiece is a material with changing cross-sections. The maximum blade advance speed varies with the type of material to be cut and is selected on the basis of an average number of teeth on the blade cutting through the material at a given instant and, of course, the loading characteristics of the particular blade employed.

The sensor of the present invention is by no means limited to applications where the band saw blade is advanced by means of an electrical motor such as a variable speed direct current motor. In a like manner the instant electronic sensor output can be employed to operate hydraulic saw blade advancing systems such as those shown in the above-mentioned U.S. Pat. No. 2,602,987 by activating the valving means thereof, by controlling the operation of hydraulic motors rather than electric motors, by controlling the advancement of a workpiece toward a fixed band saw position, and, in general, by controlling the rate of relative movement between a saw blade and a workpiece to be cut by means of hydraulic or pneumatic cylinders, screw feed means, and the like.

The foregoing discussion and the drawings are intended as illustrative but not limiting. Still other variations and rearrangements of parts within the spirit and scope of the present invention will readily present themselves to one skilled in the art.

I claim:

1. In a band saw comprising a saw blade, blade carrier means, and work platform the combination of
    a deflectable elongated band saw blade having a cutting edge and an opposing smooth edge;
    a guide means on said blade carrier means engaging said blade;
    an arm means pivotally mounted on said guide means above said blade and extending in the longitudinal direction thereof;
    a back-up roller rotatably mounted on said arm means and engaging the smooth edge of the blade;
    an elongated rod on said arm means extending in the direction of deflection of said blade;
    a rigid member mounted on said guide means and provided with an integral, stationary, non-deflecting arm;
    a piezojunction transistor, having emitter, collector, and base electrodes and a base-emitter piezojunction, mounted on said non-deflecting arm of the rigid member;

a cantilevered arm on said rigid member spaced from said non-deflecting arm, abutting a terminal portion of said elongated rod, elastically deflectable thereby, and adapted to bear against said base-emitter piezojunction when deflected;

a load resistor connected in series with said collector electrode;

a direct current source connected across said load resistor and said piezojunction transistor at the emitter electrode thereof;

an emitter bias current source connected across the base electrode and the emitter electrode of said piezojunction transistor; and means for blade advance relative to the work platform responsive to a signal output across said load resistor.

2. The combination of claim 1 wherein the blade advance means is an electric motor.

3. The combination of claim 1 wherein the blade advance means is a hydraulic motor.

* * * * *